9791X
B. Lapham.
Take-Up.
Patented Jun. 28, 1836.
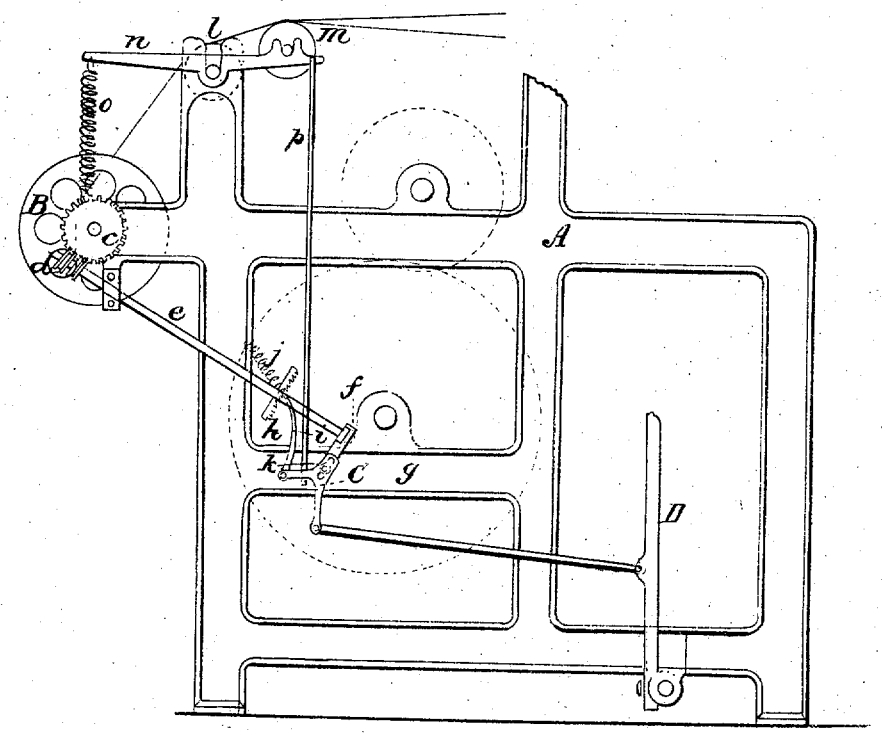

9791X    June 28, 1836

Benjamin Lapham, Waterford N. Y.

Letters Patent.

The Schedule referred to in these Letters Patent, and making part
of the same, containing a description in the words of the said
Benjamin Lapham, himself of his "Improvement in the Power Loom."

To all persons to whom these presents shall come; Be it known
that I Benjamin Lapham, of Waterford in the County of Saratoga and
State of New York, have invented a new and useful improvement in the
common power loom, a full and accurate description of which is as
follows. The object of this improvement is to unwind or let off the warp from the
warp roll in the exact ratio in which the cloth is made by the operation of weaving
thereby avoiding those imperfections which are caused by rendering off the warp
under friction. Whereby I cause the web woven to be much more even and
uniform in its texture than that heretofore generally woven by the power loom
or the hand loom. On the end of the warp roll or yarn beam is a wheel about
half the diameter of the said warp roll, more or less, on which wheel are [illegible]
teeth corresponding with the thread of a worm or endless screw, which screw
is on the back end of an arbor or shaft descending forward in an angle
of perhaps twenty five or thirty degrees with the horizon and passing thus
forward and downward to a stud on the middle side rail of the loom which
stud or stand is at right angles with the arbor of the worm screw; and is a
little back of the main or driving shaft of the loom. Near the forward end of
this arbor is, a ratchet wheel, which is fed by a hand standing nearly in a
vertical position, and operating as it rises, on the ratchet wheel at about
the middle of its horizontal diameter. This hand is kept on the teeth of the
ratchet by a spiral spring, extending backwards and fastened to the frame
of the loom at a position so much elevated as at the same to keep the hand
from descending except when forced down as will be hereinafter described
The hand is raised to produce its action on the ratchet, by an elbow the
angle of which traverses on the same pin which secures the above men-
tioned 9791x June 28, 1836 above mentioned stud to the side rail of the loom: and a rod attach
ed by the forward end to the sword of the batten, and by the
back end to the lower branch of this elbow, which the outer end
of the upper branch of said elbow is attached by a moveable joint,
to the lower end of the said hand. It follows of course that as often as
the batten goes back, the hand of the ratchet will be raised by the
backward motion of the sword, which if it have descended low
enough to take one or more new notches in the ratchet, the ratchet
will be turned one or so many notches forward, and the worm
screw will turn with it and render off the warp accordingly.
But if this ratchet should progress one or more notches at every
motion of the batten, it would probably render off the warp too
fast; and make the cloth too thin, on the other hand if it should
not operate at all, as the cloth progressed back against the reed, the
action of the loom would cease. This operation I adjust & regulate
in the following manner, In front of the back roller I place an
another a little above the other, which forward roller rests at
the ends, on the forward ends of two levers, the back ends of
which are held down by spiral springs attached to the frame
below. From the forward end of one of these levers I project
a small rod downward to that branch of the above described
elbow, to which the ratchet hand is attached which rod passes
through a hole in said branch and having a shoulder against
the upper surface, pushes it down as often as the rod and lever
to which it attached are forced down by the increased tension
of the warps, and the different connections of the said appa
ratus for operating the hand are so constructed as to give the
hand the necessary play. By these means as the warp grows tight
by the accumulation of the cloth, its tension causes the roller to
descend, and the ratchet takes one or more new notches and
the warp is rendered off accordingly; and if no cloth is made
by the action of the loom the warp remains loose and the hand not
descending, the warp remains stationary. I [illegible] claim
ec 9791x June 28, 1836 to the use of the wheel and worm screw, nor to the hand and ratchet in rendering the warp from the warp roller or yarn beam, but to the principle of feeding the ratchet by means of the increased tension of the warp, and this I claim in whatever way applied. And I also claim the entire combination, which is herein described when taken collectively but not separately except as above stated.

In witness that the foregoing is a true and accurate description of my said improvement, I have hereunto set my hand in Waterford aforesaid on the sixteenth day of May in the year one thousand eight hundred and thirty six.

Witnesses
Josiah Sawyer
Edgar B. Sherwood.

Benjamin Lapham

949 Words] (Patented 28 June 1836)